(12) United States Patent  (10) Patent No.: US 9,183,318 B2
Friedman  (45) Date of Patent: Nov. 10, 2015

(54) PROVIDING INTERACTION BETWEEN A FIRST CONTENT SET AND A SECOND CONTENT SET IN A COMPUTER SYSTEM

(75) Inventor: Julian Lawrence Friedman, Southampton (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2134 days.

(21) Appl. No.: 12/051,100

(22) Filed: Mar. 19, 2008

(65) Prior Publication Data

US 2008/0235226 A1  Sep. 25, 2008

(30) Foreign Application Priority Data

Mar. 22, 2007 (EP) .................................. 07104659

(51) Int. Cl.
*G06F 17/30* (2006.01)
*G06F 17/00* (2006.01)

(52) U.S. Cl.
CPC ............................... *G06F 17/30899* (2013.01)

(58) Field of Classification Search
USPC .......................... 707/707–710, 722, 736–737
See application file for complete search history.

(56) References Cited

U.S. PATENT DOCUMENTS

| | | | | |
|---|---|---|---|---|
| 7,552,170 | B2 * | 6/2009 | Owen et al. | 709/203 |
| 7,676,465 | B2 * | 3/2010 | Poola | 707/999.005 |
| 7,680,855 | B2 * | 3/2010 | Hyder et al. | 707/710 |
| 7,685,192 | B1 * | 3/2010 | Scofield et al. | 707/709 |
| 7,831,556 | B2 * | 11/2010 | Behl et al. | 707/625 |
| 7,899,803 | B2 * | 3/2011 | Cotter et al. | 707/706 |
| 8,046,681 | B2 * | 10/2011 | Vydiswaran et al. | 715/234 |
| 2006/0156228 | A1 | 7/2006 | Gallo et al. | |
| 2007/0061487 | A1 | 3/2007 | Moore et al. | |

* cited by examiner

*Primary Examiner* — Yicun Wu
(74) *Attorney, Agent, or Firm* — Steven L. Nichols; Van Cott, Bagley, Cornwall & McCarthy P.C.

(57) ABSTRACT

Interaction is provided between a first content set and a second content set, both of which are loaded into a data structure. When an event associated with loading of the second content set is detected, the second content set is parsed to identify at least one sub-set of the second content set. The identified sub-set is checked against a first data set associated with the first content set to determine whether the identified sub-set matches the first data set. If a match is found, an action associated with the least one identified sub-set is executed and the data structure is modified.

16 Claims, 7 Drawing Sheets

```
<?xml version="1.0"?>
 <rss version="2.0">
     <channel>
         <item>
             <title>Company A buys Company B </title>
                 <link>news.co.1234</link>
                     <category>Company_A</category>
                     <category>Company_B</category>
             <author>john_smith@address123</author>
         </item>
</rss>
```

FIG. 7

```
<html>
    <head>
        <title>MyRSS News</title>
    </head>
        <body>
            <ol>
                <li>
    <a>href="news.co.1234"> Company A buys Company B</a>
                </li>
            </ol>
        </body>
</html>
```

FIG. 8

PROVIDING INTERACTION BETWEEN A FIRST CONTENT SET AND A SECOND CONTENT SET IN A COMPUTER SYSTEM

BACKGROUND OF THE INVENTION

The present invention relates to the display of content in a computer system and more particularly to providing interaction between a first content set and a second content set.

Content display in computer applications can be personalized by a user. For example, a user can select web content from multiple content providers for display within a single web page.

Figure 1:
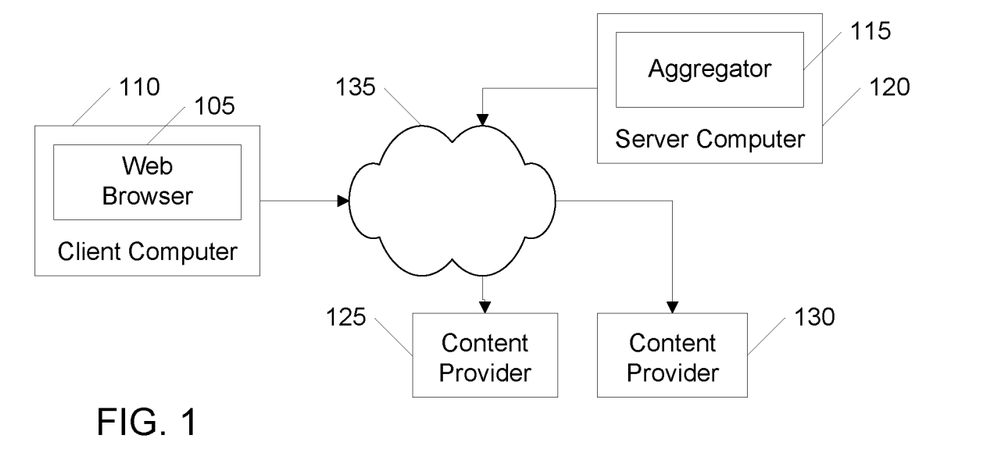
FIG. 1 is a basic block diagram of a system for personalizing content display in a web page.

Aggregators are applications that allow a user to personalize content display. Aggregators can execute on a server computer or a client computer associated with the user. FIG. 1 shows a system 100 for personalizing content display in a web page. The system 100 includes a client computer 110 having a web browser 105 and a server computer 120 having an aggregator 115. The aggregator 115 and the web browser 105 communicate, through a network 135, with one or more content providers 125 and 130 represented as servers connected to the network.

A user can use registration functions provided by the aggregator 115 to register (in other words, to "select") a content set available from a content provider. For example, the user registers a first content set comprising a stock application associated with the first content provider 125 and a second content set comprising a banking application associated with the second content provider 130.

Figure 2:
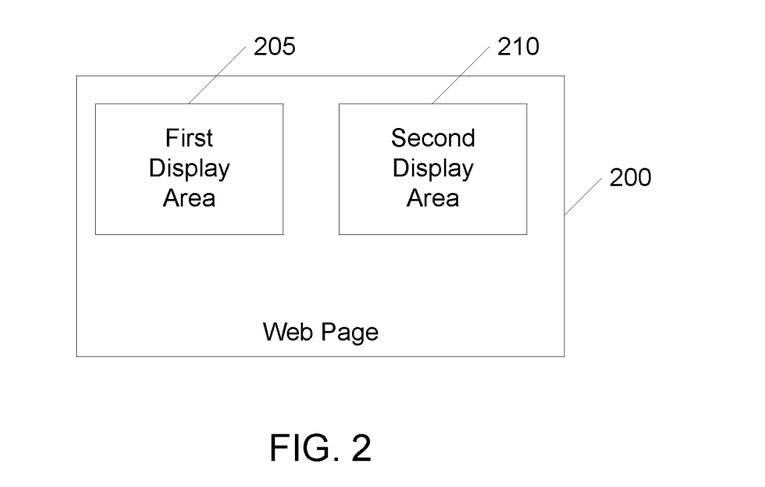
FIG. 2 is a block diagram of a web page generated using the system of FIG. 1.

The aggregator 115 uses the registration functions to retrieve the associated content sets. After retrieving the content sets, the aggregator 115 sends the content sets and an associated web page to the web browser 105 in client computer 110. The web browser 105 displays the content sets in the web page. Typically, different content sets are displayed in separate display areas within the web page. FIG. 2 is a simplified example of a web page 200 having a first display area 205 for displaying the first content set and a second display area 210 for displaying the second content set.

Typically, the aggregator 115 also uses the registration functions to retrieve updates associated with content sets. After retrieving the updates, the aggregator 115 sends the updates to the web browser 105, which causes the updates to be displayed in the display area associated with the updated content set.

If the first content set and the second content set are provided by different content providers, as is commonly the case, there is no association between the first content set and the second content set.

Although current aggregators allow for content sets to be easily aggregated for display with minimal set up and user knowledge, there remains a need for increased flexibility in the way a user can use the content sets.

BRIEF SUMMARY OF THE INVENTION

The present invention may be embodied as a method for providing interaction between a first content set loaded into a data structure and a second content set which is also loaded into the data structure. When an event associated with the loading of the second content set is detected, the second content set is parsed to identify a sub-set. The identified sub-set is compared to a first data set associated with the first content set. If a match is found, an action associated with the identified sub-set is executed.

The invention may also be embodied as an apparatus for providing interaction between a first content set and a second content set, both of which are loaded into a data structure. When a listener detects an event associated with the loading of the second content set, a parser responds by parsing the second content set to identify a sub-set of the second content set. A checker determines whether a match exists between the identified sub-set and a first data set associated with the first content set. A controller responds to the finding of a match by executing an action associated with the identified sub-set.

Finally, the invention may be embodied as a computer program product for providing interaction between a first content set loaded into a data structure and a second content set. The computer program product includes a computer usable medium embodying computer usable program code that is configured to load the second content set into the data structure, detect an event associated with the loading of the second content set, respond to a detected event by parsing the second content set to identify a sub-set, compare the identified sub-set to a first data set associated with the first content set to determine if a match exists, and respond to the finding of a match by executing an action associated with the identified sub-set.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
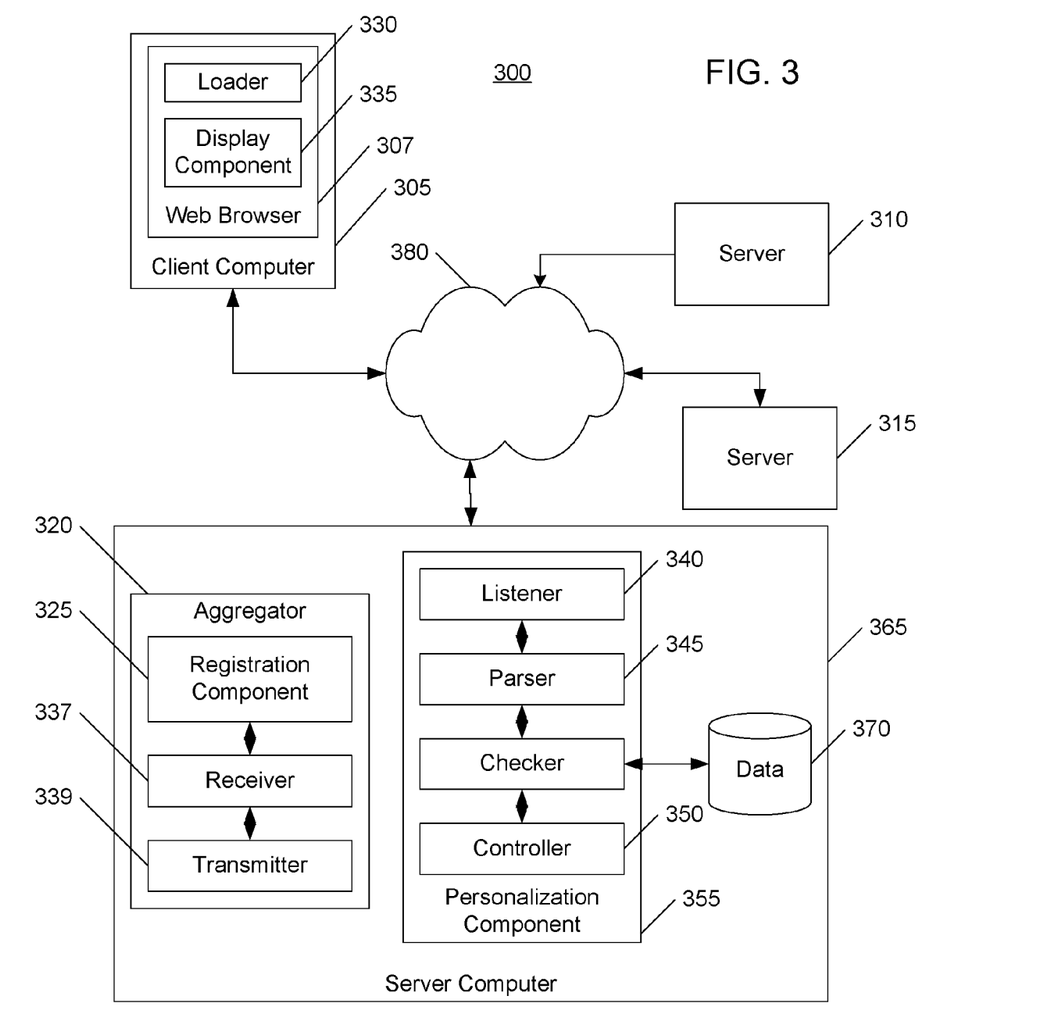
FIG. 3 is a block diagram of a system for personalizing content display in a web page in accordance with an embodiment of the present invention.

FIG. 3 shows a system 300 for personalizing content display in a web page according to one embodiment of the present invention. The system 300 includes a client computer 305 having a web browser 307 and a server computer 365 having an aggregator 320 and a personalization component 360.

The web browser 307 includes a loader 330 and a display component 335.

The aggregator 320 includes a registration component 325. The personalization component 360 includes a listener (340) for listening for events, a parser 345, a checker 350 and a controller 355. The checker 350 and the controller 355 are operable to access associated data 370.

The client computer 305 and the server computer 365 can communicate with one or more servers 310 and 315 via network 380. Each of the servers 310 and 315 may be associated with a different content provider.

A user of the client computer 305 uses the web browser 307 to access the aggregator 320 and sends a request for a first web page to the receiver 337 in the aggregator 320. In response, transmitter 339 sends the first web page to the loader 330 in the web browser 307 in client computer 305. The first web page may include an associated first XHTML document. The loader 330 loads the first XHTML document into memory at the client computer 305 and parses it into a tree structure.

In one embodiment, the tree structure is a DOM (Document Object Model) structure. The DOM defines a logical tree-like structure of a document and the way in which a document is accessed and manipulated.

Once loaded into memory and parsed, the tree structure can be accessed. Elements, attributes and text of a document can be represented as objects (known as nodes). It should be understood that any number of logical structures can be used.

Figure 5A:
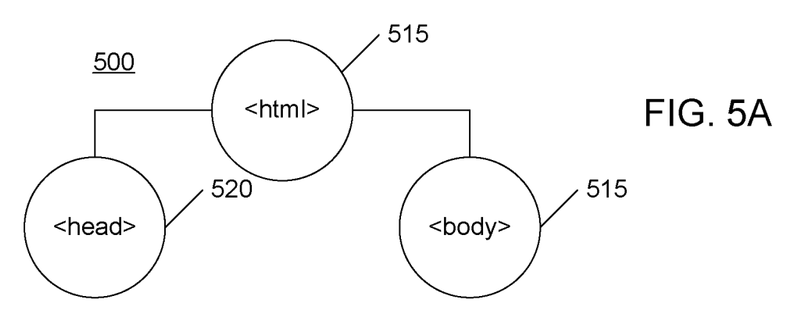
FIG. 5A is a representation of a first tree structure.

An example of a portion of the associated tree structure 500 is shown in FIG. 5A. The tree structure includes a number of nodes representing elements of the first XHTML document (e.g. an html element 515, a head element 520 and a body element 525.

Figure 6:
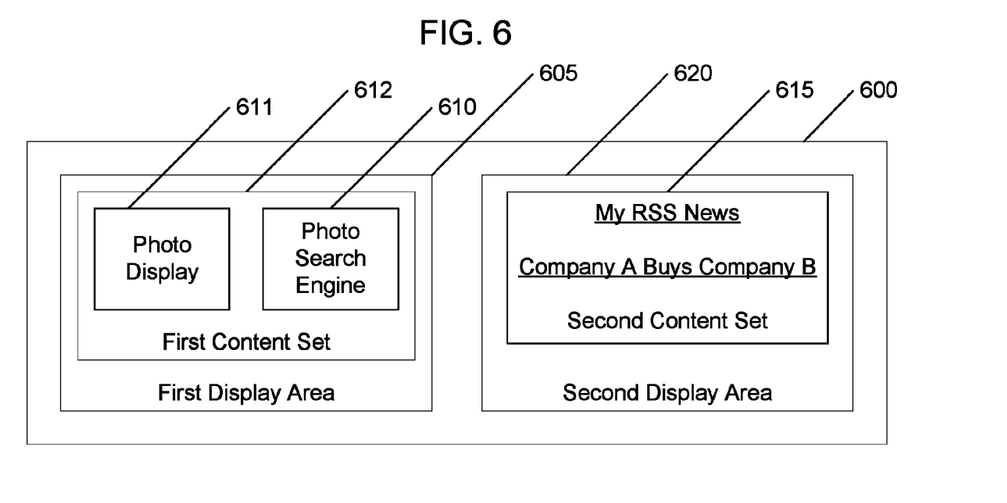
FIG. 6 is a block diagram a web page generated in accordance with the present invention.

Following loading, the content represented by the tree structure 500 is displayed. FIG. 6 is a simplified representation of a displayed web page 600.

Figure 4:
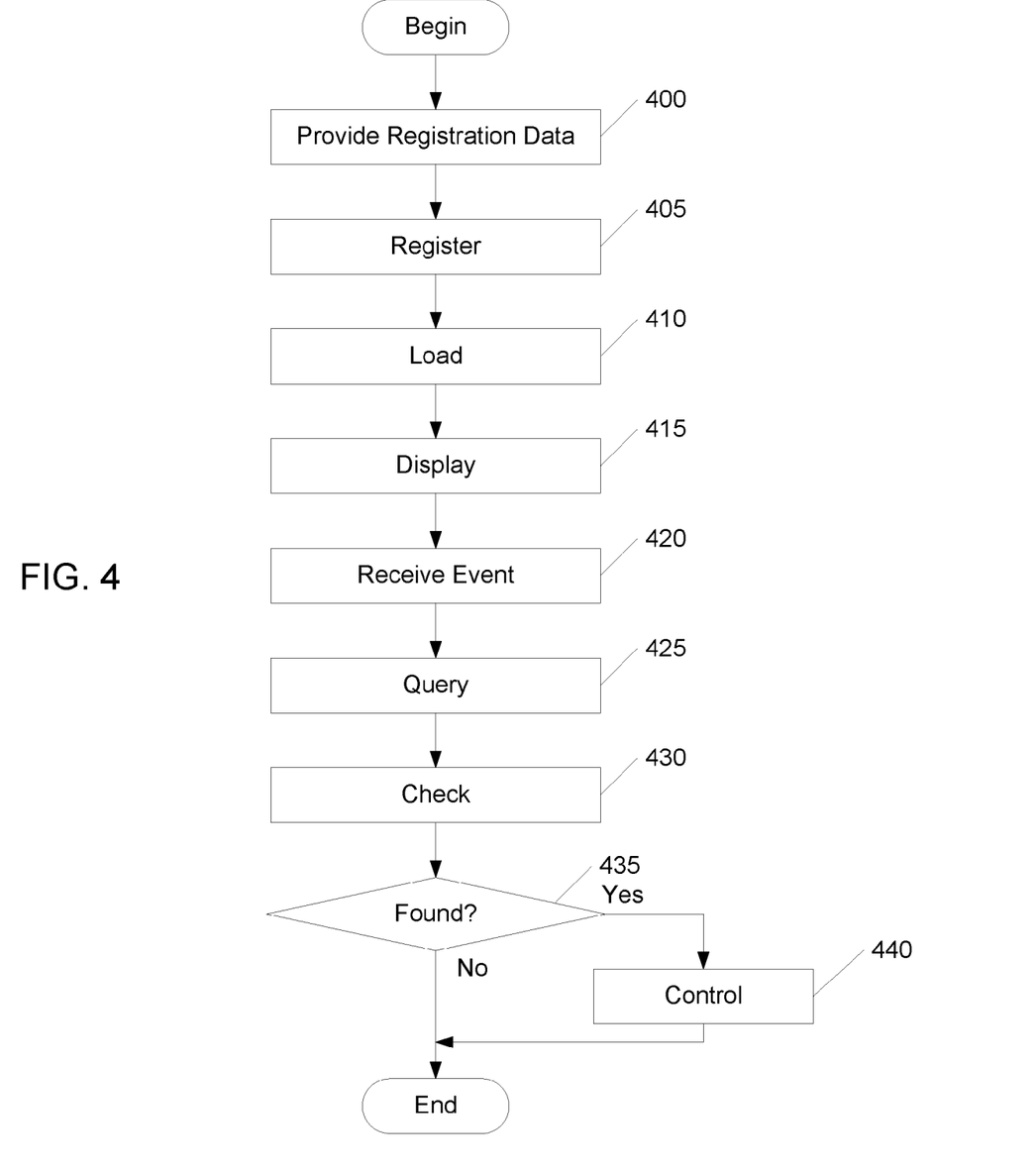
FIG. 4 is a flow chart of operations performed in a process implemented in accordance with an embodiment of the present invention

For purposes of illustration, it is assumed the user wishes to add content to the web page 600. FIG. 4 shows the basic operations that would be performed. In operation 400, the user, acting through the web browser in the client computer, provides registration data associated with a first content set to the registration component in the aggregator.

Assume for purposes of illustration that the first content set includes a photo application having a photo display component and a photo search engine and that the first content set is available at server 310 associated with a first content provider. The registration data may take the form of a URL associated with the first content set (e.g., www.photo.co) on the server.

The registration component uses the registration data to create a registration (operation 405) associated with the first content set and then uses the URL contained in the registration to generate a request for the first content set. In response to the request, the first content provider returns the first content set to the registration component. The first content set may be an associated second XHTML document that is transmitted to the loader component in the client computer.

Figure 5B:
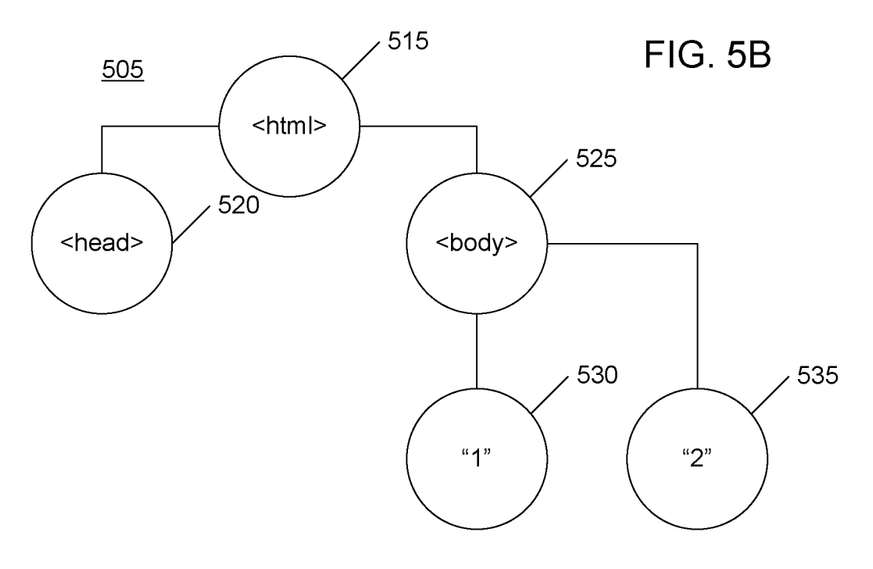
FIG. 5B is a representation of a second tree structure.

The loader loads (operation 410) the first content set by generating a tree structure in memory for the second XHTML document associated with the first content set and loading the tree structure associated with the second XHTML document into the tree structure associated with the first XHTML document. A representation of the resulting tree structure (505) is shown in FIG. 5B, wherein node "1" (535) represents the tree structure of the first content set.

Following loading, the display component displays the tree structure 505. With reference to FIG. 6, the first content set 610 (including the photo display component 611 and the photo search engine 612 is displayed (operation 415) in a first display area 605 within the first web page 600. If the user does not wish to add further content to the first web page 600, the process ends.

Assuming the user wishes to add further content to the first web page 600, then the user utilizes the web browser in the client computer to again provide the registration component in the aggregator with registration data associated with a second content set.

In the example being discussed, it is assumed the second content set comprises a news article provided by second content provider at server 315. The registration data may, for purposes of illustration, be a URL associated with the second content set (e.g. www.news.co).

The registration component uses the newly-provided registration data to create a registration associated with the second content set and then uses the URL to request the second content set. In response to the request, the second content provider returns the second content set to the registration component. It is assumed the second content set takes the form of an RSS document.

RSS (Really Simple Syndication) has become a popular delivery mechanism for users wishing to subscribe to news headlines. RSS may be described as a lightweight eXtensible Markup Language (XML) format designed for sharing headlines and other content. There are various specifications and standards that further define RSS.

Figure 7:
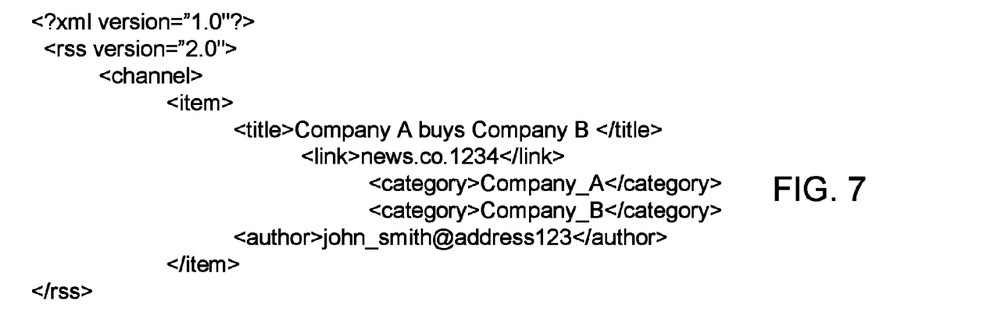
FIG. 7 is a representation of an RSS document.

An example of an RSS document is shown in FIG. 7. The RSS document includes: "<channel> </channel> tags specifying multiple "channels" (or categories); a first set of "<title> </title>" tags representing a title associated with the RSS document; a set of "<item> </item>" tags specifying a list of items (in the example, the list includes a set of news items). The list includes a first news item having a title specified by a second set of "<title> </title>" tags; a URL specified by "<link> </link>" tags; associated categories specified by two sets of "<category> </category>" tags and author data associated with an author of the news item and specified by "<author> </author>" tags.

Figure 8:
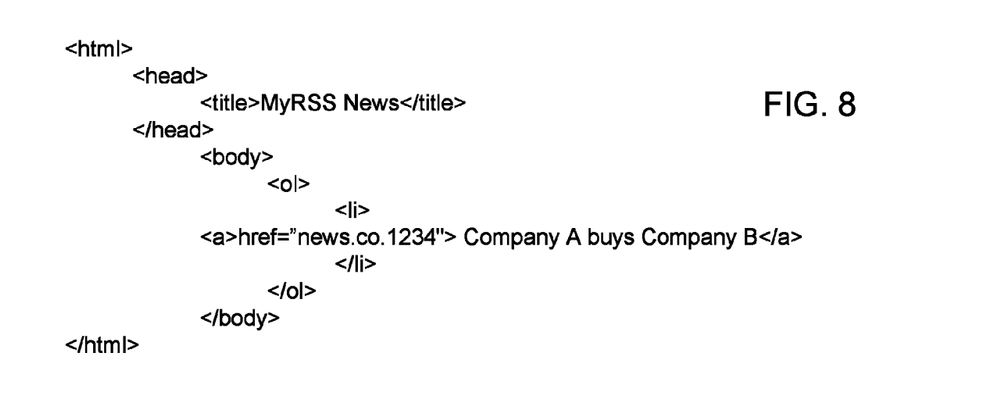
FIG. 8 is a representation of an XHTML document associated with the RSS document of FIG. 7.

The second content set is sent to the loader component in the client computer. Preferably, the loader converts the RSS document into a third XHTML document (e.g. using an XSL stylesheet). An example of the third XHTML document is shown in FIG. 8.

The third XHTML document includes: "<html> </html>" tags specifying the third XHTML document; "<head> </head>" tags specifying a head; a first set of "<title> </title>" tags representing a title associated with the third XHTML document; "<body> </body>" tags specifying a body; "<ol> </ol>" tags specifying an ordered list of items; "<li> </li>" tags specifying an item in the ordered list; and anchor tags "<a> </a>" which define an anchor that can be used to create a link (wherein the "href" attribute specifies a URL of the link). A text string within the "<a> </a>" tags is used to create the link. For example, the text "Company A buys Company B" is shown as a clickable link to a user wherein the URL of the link is "news.co.1234".

It should be understood that there is no equivalent in XHTML of the "<category> </category>" tags and "<author> </author>" tags. Thus, during conversion of the RSS document into the third XHTML document, these tags and associated data are ignored.

With reference to FIG. 4, the loader in the client computer loads (operation 410) the second content set by generating a tree structure in memory for the third XHTML document associated with the second content set and loading the tree structure associated with the third XHTML document into the tree structure associated with the first XHTML document.

A representation of the resulting tree structure (505) is shown in FIG. 5B, wherein node "2" (535) represents the tree structure of the second content set.

Figure 5C:
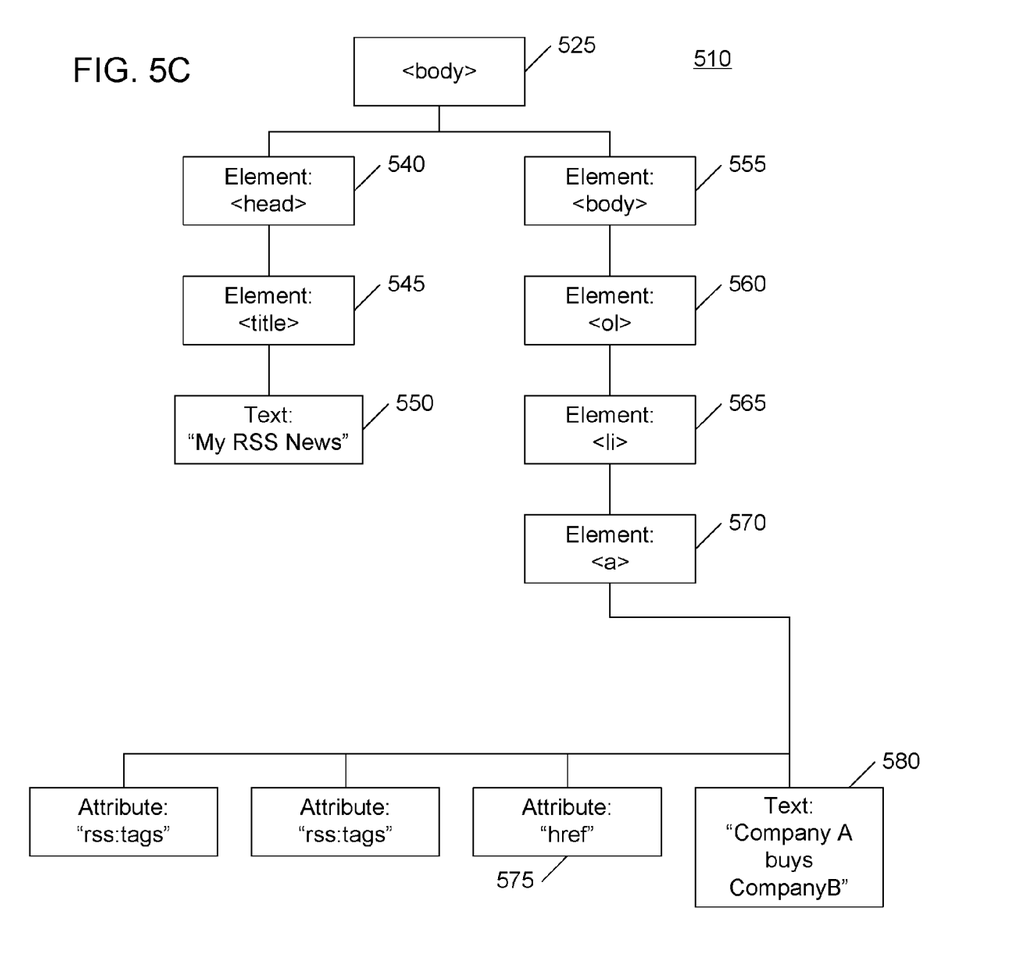
FIG. 5C is a representation of a third tree structure.

The tree structure 510 associated with the second content set is shown in more detail in FIG. 5C. The tree structure comprises a head element node 540 (which is a child node of the body element node 525 of the tree structure 505 shown in FIG. 5B. The head element node 545 has an associated title element node having an associated first text node 550. The tree structure also includes a body element node 555 having an associated ordered list element node 560, an associated list item element node 565 and an associated anchor element node 570. The anchor element node includes an associated first attribute node 575 (including an associated identifier, i.e. "href") and an associated second text node 580. It should be understood that element and attribute nodes can include associated values.

For the data that cannot be converted to XHTML (i.e. "<category> </category>" tags and "<author> </author>" tags), the loader in the client computer can add data associated with the data that cannot be converted to XHTML to the tree structure for use by the personalization apparatus. To add data associated with the data that cannot be converted to XHTML to the tree structure, the loader generates one or more associated attribute nodes. Preferably, the loader uses name spacing, in order to ensure uniqueness of attribute values.

In the example, the loader (330) generates a second attribute node having an identifier of "rss:tags" and values of "Company_A" and "Company_B" and a third attribute node having an identifier of "rss:tags" and a value of "john_smith@address123".

Preferably, the first content provider provides rules to the loader specifying how data associated with the data that cannot be converted to XHTML can be added to the tree structure 505 (e.g. an identifier associated with data that cannot be converted to XHTML and an identifier associated with a corresponding attribute node).

Preferably, the loader 330 associates the generated attribute nodes with an element node. Preferably, the element node is associated with the content of the data that cannot be converted to XHTML.

In the example, the loader 330 associates the generated attribute nodes with the anchor element node.

A representation of the resulting tree structure 510 is shown in FIG. 5C, wherein the anchor element node comprises the second attribute node and the third attribute node.

With reference to FIGS. 4 and 6, in response to the loading step, the display component displays the tree structure 510. As a result, with reference to FIG. 6, the second content set 615 (comprising a title "My RSS News" and a clickable link comprising associated text "Company A buys Company B") is displayed (step 415) by the display component in a second display area 620 within the web page 600.

It should be understood that data that cannot be converted to XHTML is not displayed and is ignored by the display component.

In response to the loading step, a load event is generated by the loader 330 and sent to the listener 340, such that the listener 340 is alerted that the tree structure has been modified. The load event comprises data associated with the tree structure of the second content set (e.g. an identifier). In response to receiving (step 420) the load event, the listener 340 invokes the parser 345.

Alternatively, the parser 345 may be operable to parse a tree structure at regular intervals in order to determine whether when the tree structure has been modified.

The parser 345 queries (step 425) the tree structure associated with the second content set (e.g. using the identifier) to determine pre-configurable data. In the example herein, the pre-configurable data comprises attribute nodes.

In the example, the parser 345 finds three attribute nodes and sends identifiers (e.g. "rss:tags" and "href") and values (e.g. "Company_A", "Company_B", "john_smith@address123", "news.co.1234" and "Company A buys Company B") associated with the three attribute nodes to the checker 350.

Upon receiving the identifiers, the checker 350 checks (step 430) the identifiers against the data (370). In the example herein, the data (370) comprises a list of attributes. An example of the list of attributes is shown below. In the list below, the attribute "geo:location" is for example, associated with latitude and longitude data.

Preferably, the list is pre-configurable by an administrator. In one example, the list is obtainable from a content provider.

It should be understood that any number of types of data can be included in the list e.g. attributes associated with data that can be converted to XHTML, element node data etc.

| List: |
|---|
| rss:tags |
| geo:location |
| If a match is not found (step 435), the process ends. |

In the example, the checker 350 finds a match (step 435) in the list (namely, the identifier "rss:tags" is present in the list) and invokes the controller 355. The checker 350 also sends the matching identifier "rss:tags" and associated values (e.g. "Company_A", "Company_B", "john_smith@address123") to the controller 355.

Preferably, the controller 355 is operable to access the data 370. In the example herein, the data 370 includes a list comprising one or more actions associated with an identifier of an attribute and an identifier of a content set. Thus, preferably, a particular action is associated with a particular attribute identifier and content set identifier.

Preferably, the list is pre-configurable by an administrator. In one example, the list is obtainable from a content provider.

An example of the list is shown below:

| List: |
|---|
| onmouseover ( ); |
| rss:tags; www.photo.co |
| onclick ( ); rss:tags; www.banking.co |

In the example herein, the controller 355 requests an identifier associated with the first content set from the registration component 325 (that is, the content set that was loaded first).

In response to the request, the registration component 325 sends the URL associated with the first content set (i.e. www.photo.co) to the controller 355.

The controller 355 compares the identifier "rss:tags" and the URL against the list in order to find an action. In the example herein, the controller 355 finds an action specified by a function (i.e. onmouseover ( )).

With reference to FIG. 4, the controller 355 executes (step 440) the function. In the example, the onmouseover ( ) function comprises operations that are performed when a user moves a mouse cursor over a link.

The onmouseover ( ) function may include a number of sub-functions. A first sub-function obtains the value of each of the attributes (i.e. "Company_A", "Company_B" and "john_smith@address123") from the controller 355. A second sub-function inputs the obtained values into the photo search engine 612 associated with the first content set, receives results and sends the results to the controller 355.

Upon executing the function, the controller 355 might retrieve three images, that is, a first image associated with the value "Company_A" comprising associated source data (e.g. "image1.gif"), a second image associated with the value "Company_B" comprising associated source data (e.g. "image2.gif") and a third image associated with the value "john_smith@address123" comprising associated source data (e.g. "image3.gif").

The controller 355 sends the identifiers and source data to the loader 330.

For each of the images, the controller 355 controls the loader 330 to add data associated with the results to the tree structure 510. For example, the controller 355 generates and sends an instruction to the loader 330 to generate an image element node having an associated attribute representing source data of the location of the image to be loaded.

In the present example, the loader (330) generates a first element having an associated "src" attribute with a value of "image1.gif"; a second element node having an associated "src" attribute with a value of "image2.gif"; and a third element node having an associated "src" attribute with a value of "image3.gif".

Figure 5D:
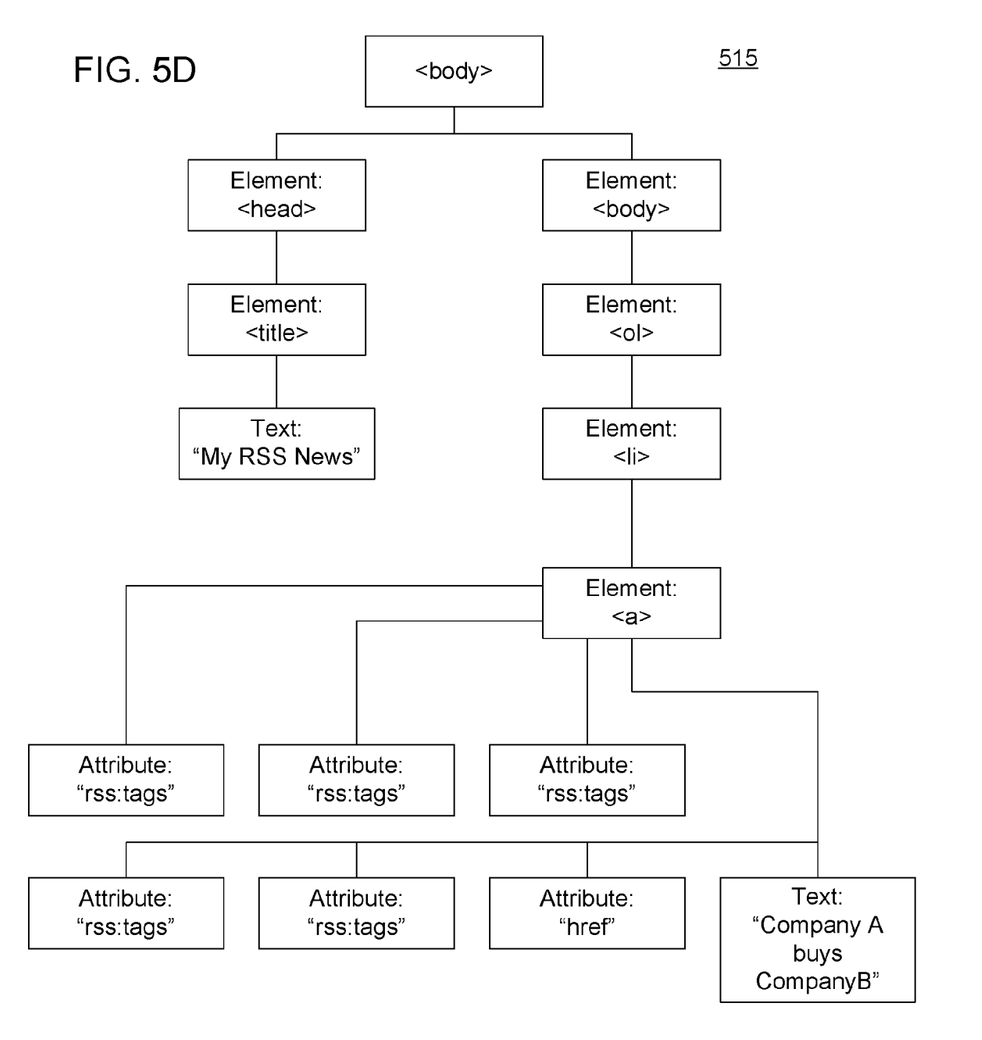
FIG. 5D is a representation of a fourth tree structure.

The loader (330) adds the element nodes to the tree structure (510). In the example herein, the element nodes are associated with the anchor element node. A representation of the resulting tree structure (515) is shown in FIG. 5D.

In response to the loading step, the display component (335) displays the tree structure (515) in the second display area (620) within the first web page (600). As a result, with reference to FIG. 6, the second content set (615) (comprising a title "My RSS News" and a clickable link comprising associated text "Company A buys Company B") is re-displayed (step 415) by the display component (335) in the second display area (620) within the first web page (600).

However, in the example, if a user moves a mouse cursor over the clickable link associated with the anchor element (i.e. "Company A buys Company B"), in response to the execution (step 440) of the onmouseover ( ) function, the three images associated with Company A, Company B and the author of the news item are displayed in the second display area (620) within the first web page (600).

It should be understood that any number of actions can be executed. For example, if a user moves a mouse cursor over the clickable link associated with an anchor element (i.e. "Company A buys Company B"), a map showing a location of Company A's premises may be displayed.

Advantageously, the present invention allows for behavior of the second content set to be modified (e.g. with functionality associated with the first content set). Advantageously, this modified behavior can be provided without tight coupling or interaction required between the content sets (and therefore, the content providers).

The preferred embodiment provides rich behavior to previously un-linked content sets displayed within a web page. For example, a function associated with one content set (e.g. a zoom function allowing data to be zoomed) can be associated with a second content set displayed on a web page. This allows the second content set to benefit from the zoom behavior even though the second content set did not initially exhibit this behavior.

It should be understood that the personalization apparatus can be associated with any component. For example, the personalization apparatus can be associated with a content set e.g. wherein the personalization apparatus is implemented as one or more scripts. In an example, if two content sets each have an associated personalization apparatus, preferably, each content set comprises a negotiation component such that the content sets can negotiate e.g. as to how data associated with data that cannot be converted to XHTML can be added to a tree structure (505); as to the content of the data (370) e.g. the list of attributes and actions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for providing interaction between a first content set loaded into a data structure in which said first content set is represented by nodes arranged in a tree structure and a second content set, the method comprising, with a computer:
    loading the second content set into the data structure by representing said second content set with nodes in a tree structure which is added to the tree structure of said first content set;
    detecting an event associated with the loading of the second content set into the data structure;
    in response to the detecting step, parsing the second content set to identify a sub-set of the second content set;
    comparing the identified sub-set to a first data set associated with the first content set to determine if a match exists; and
    in response to the finding of a match, executing an action associated with the identified sub-set such that additional content derived from the first content set is associated with the second content set.

2. A method according to claim 1, further comprising modifying the data structure in response to the executing step.

3. A method according to claim 2, further comprising transmitting the modified data structure to a computer system for display.

4. A method according to claim 1, wherein loading of the first and second content sets into the data structure is responsive to at least one of a user request and a rules engine.

5. A method according to claim 1, wherein the first content set comprises a negotiation component.

6. A method according to claim 1, wherein the data structure comprises a markup language document.

7. A method according to claim 1, wherein:
    said first content set comprises access to an image search engine;
    said action comprises using said image search engine to search for images based on said sub-set of said second content set; and
    said additional content comprises an image produced by said search, said image produced by said search being associated with the second content set.

8. A method according to claim 1, wherein loading the second content set into the data structure comprises converting said second content set into an Markup Language document and then representing said second content set with nodes in a tree structure which is added to the tree structure of said first content set, wherein data from said second content set that cannot be converted to Markup Language is represented by attribute nodes added to said tree structure.

9. A method according to claim 1, further comprising:
    associating that additional content with the second content set in an electronic document;
    displaying said electronic document on a computer comprising a display device and a user input device comprising a device for moving a cursor on said display device; and if said cursor is moved to a position over a specific part of said first content set, said additional content is made to appear on said display device in association with said second content set.

10. An apparatus comprising a server for providing interaction between a first content set and a second content set, both of which are loaded into a data structure, the server comprising:
- a processor;
- a listener for detecting an event associated with the loading of the second content set into the data structure;
- a parser, responsive to an event detection by the listener, for parsing the second content set in order to identify a sub-set of the second content set;
- a checker for determining whether the identified sub-set matches a first data set associated with the first content set; and
- a controller, responsive to the finding of a match between the identified sub\-set and the first data set, for executing an action associated with the identified sub-set such that additional content derived from the first content set is associated with the second content set.

11. An apparatus as claimed in claim 10, further comprising a loader for modifying the data structure in responsive to execution of the action.

12. An apparatus as claimed in claim 11, further comprising a transmitter for transmitting the modified data structure to a computer system for display.

13. An apparatus as claimed in claim 10, wherein loading of the first and second content sets into the data structure is responsive to at least one of a user request and a rules engine.

14. An apparatus as claimed in claim 10, wherein the first content set comprises the listener, the parser, the checker and the controller.

15. An apparatus as claimed in claim 10, wherein the first content set comprises a negotiation component.

16. An apparatus as claimed in claim 10, wherein the data structure comprises a markup language document.

\* \* \* \* \*